(12) United States Patent
Bowler et al.

(10) Patent No.: US 7,404,760 B2
(45) Date of Patent: Jul. 29, 2008

(54) CONTROL WHEEL FOR AN AUTOMOTIVE AIR VENT

(75) Inventors: Geoffrey H. Bowler, Ballantrae (CA); Karel Caslavsky, Toronto (CA); Luliu V. Dinescu, Aurora (CA); Thomas Woegerer, Palgrave (CA)

(73) Assignee: Progressive Moulded Products Inc., Concord, Ontario (CA)

( * ) Notice: Subject to any disclaimer, the term of this patent is extended or adjusted under 35 U.S.C. 154(b) by 282 days.

(21) Appl. No.: 11/213,746

(22) Filed: Aug. 30, 2005

(65) Prior Publication Data

US 2006/0079165 A1   Apr. 13, 2006

(30) Foreign Application Priority Data

Oct. 8, 2004   (CA) .................................. 2484305

(51) Int. Cl.
*B60H 1/34* (2006.01)
*B60H 1/00* (2006.01)
*G05G 5/06* (2006.01)

(52) U.S. Cl. .................... 454/69; 454/143; 454/152; 454/155

(58) Field of Classification Search ............... 454/69, 454/152, 155, 143, 322, 333
See application file for complete search history.

(56) References Cited

U.S. PATENT DOCUMENTS

| | | | | |
|---|---|---|---|---|
| 2,410,832 A | * | 11/1946 | McLean | 403/361 |
| 5,069,112 A | * | 12/1991 | Takayama et al. | 454/162 |
| 5,120,272 A | * | 6/1992 | Soethout et al. | 454/155 |
| 5,584,098 A | * | 12/1996 | Koyama et al. | 16/441 |
| 6,047,951 A | * | 4/2000 | Ito et al. | 251/308 |
| 6,059,652 A | * | 5/2000 | Terry et al. | 454/155 |
| 6,582,293 B1 | * | 6/2003 | Siniarski et al. | 454/155 |
| 2003/0157880 A1 | * | 8/2003 | Nishida et al. | 454/155 |

FOREIGN PATENT DOCUMENTS

| | | | |
|---|---|---|---|
| EP | 405380 A1 | * | 1/1991 |
| EP | 1216862 A2 | * | 6/2002 |
| EP | 1452359 A1 | * | 9/2004 |
| JP | 61083838 A | * | 4/1986 |

* cited by examiner

*Primary Examiner*—Steven B. McAllister
*Assistant Examiner*—Patrick F. O'Reilly, III
(74) *Attorney, Agent, or Firm*—Lang Michener LLP

(57) ABSTRACT

A control wheel for controlling a control in an automotive vent has a resilient bushing which provides a frictional force to retain the control wheel in a desired position. The frictional force is substantially independent of tolerances of the components of the control wheel due to expected manufacturing variations.

9 Claims, 4 Drawing Sheets

CONTROL WHEEL FOR AN AUTOMOTIVE AIR VENT

FIELD OF THE INVENTION

The present invention relates to automotive ventilation systems and the like. More specifically, the present invention relates to a control wheel with a resilient element to provide a frictional retaining force for the control wheel and which frictional retaining force is substantially independent of tolerances in the components of the control wheel.

BACKGROUND OF THE INVENTION

Automobiles are typically provided with passenger compartment air systems which can provide fresh and/or recirculated air to the passenger compartment for passenger comfort. Typically, at least a portion of this air is introduced into the passenger compartment through vents which include control surfaces such as a damper, control vanes and louvers that can be adjusted by the passengers to select a flow rate and to direct the air to a desired direction.

In the past, a variety of mechanisms have been provided to passengers to operate these control surfaces and one of the more popular mechanisms is a control wheel which can be rotated by the passenger with their thumb or finger. A control, typically a shaft, cable or other linkage, extends between the control wheel and the control surface and is moved when the control wheel is operated to appropriately move the control surface. Ideally, such a control wheel will be inexpensive to manufacture, easy to assemble, easy to operate and will remain in a selected position until intentionally moved to another position by a passenger.

A prior control wheel constructed by the assignee of the present invention employed a resilient bushing mounted in the wheel and riding on the shaft about which the control wheel rotates to provide the frictional force to maintain the control wheel in the position it was put in by the passenger and to isolate, to at least some extent, the control wheel from vibrations of the automobile. However, this control wheel suffered from disadvantages in that the resilient bushing and the receptacle in the wheel in which it is mounted and the shaft which it engages are subject to manufacturing and/or thermal tolerances which can result in different control wheels experiencing different frictional forces, which is undesirable. Manufacturing tolerances can result in the bushing being compressed, or loose, when installed in the receptacle in the wheel with the result that the bushing will be too tight or too loose on the shaft. Similarly, the tolerances can change, due to the effects of temperature changes in the passenger compartment, which expand or contract the bushing and other components.

It is desired to have a control wheel which is reasonably inexpensive to manufacture and whose operation is acceptable despite minor changes in tolerances of the components of the control wheel.

SUMMARY OF THE INVENTION

It is an object of the present invention to provide a novel control wheel which obviates or mitigates at least one disadvantage of the prior art.

According to a first aspect of the present invention, there is provided a control wheel for operating a control surface in an automotive vent, comprising: a wheel member having an attachment point to which the control can be connected; a shaft about which the wheel member can rotate to move the control; a resilient bushing mounted in a receptacle in the wheel member, the bushing having a bore engaging the shaft which passes through it and the bushing acting between the wheel member and the shaft to create a frictional force to inhibit free rotation of the wheel member about the shaft, the resilient bushing including at least one boss on its outer periphery such that when the bushing is mounted in the receptacle there is a clearance between the bushing and the receptacle except where the at least one boss engages a complementary slot in the receptacle to provide a connection between the bushing and the wheel member, the clearance being sized to accommodate expected tolerances; and a snap cap to maintain the wheel member on the shaft.

Preferably, the control wheel also includes a limit track on the wheel member and an arm on the snap cap, the arm having a portion engaging the limit track to limit the range through which the wheel member can be rotated on the shaft to a permitted range.

The present invention provides a control wheel for an automotive vent or the like that is relatively easy to assemble and which provides a frictional force provided by a resilient bushing to retain the control wheel in a desired position, which frictional force is substantially independent of tolerances of the components of the control wheel.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
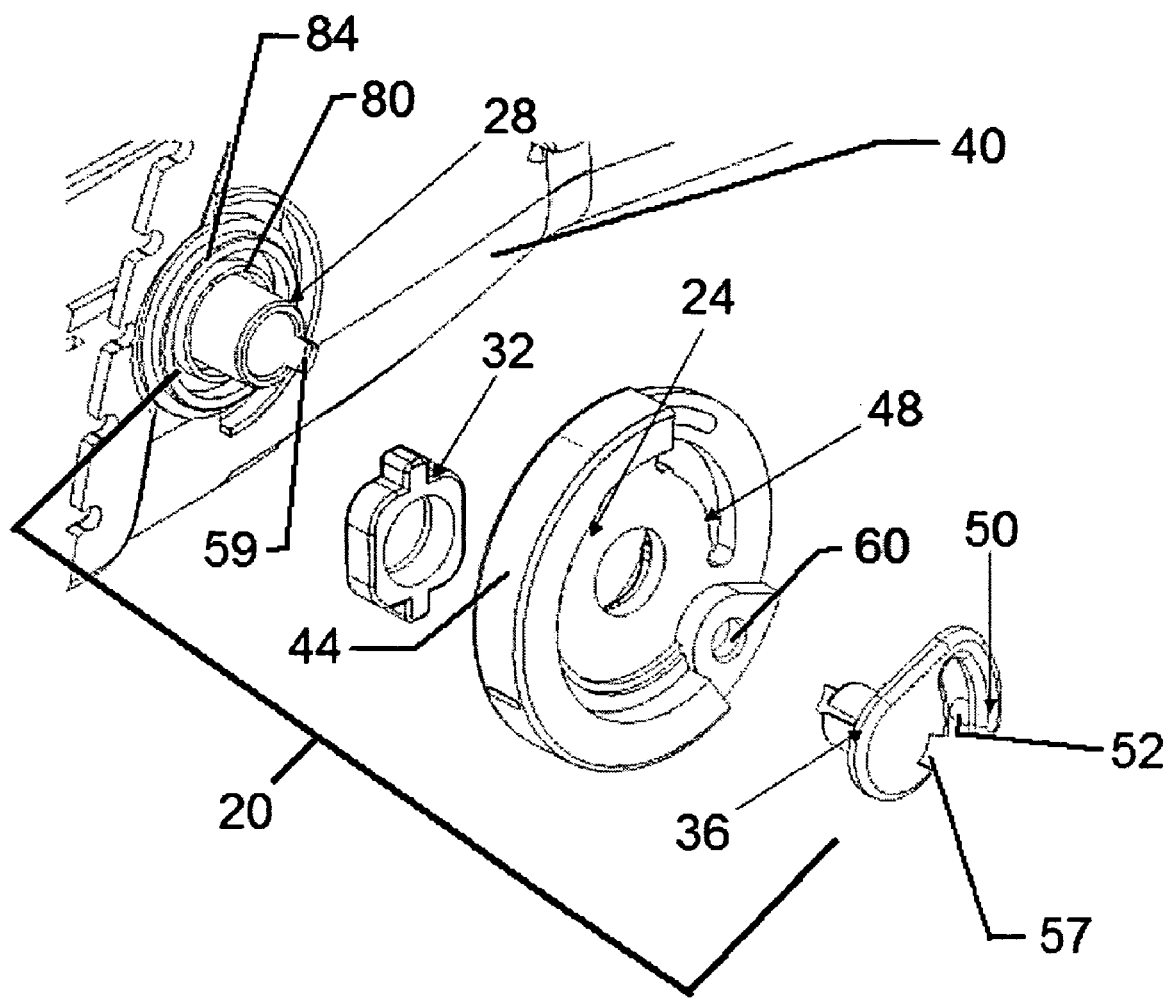
FIG. 1 shows an exploded perspective view of the outer side of a control wheel in accordance with the present invention.

A control wheel in accordance with an embodiment of the present invention is indicated generally at 20 in FIG. 1. Control wheel 20 comprises a wheel member 24, a shaft 28, a resilient bushing 32 which acts between wheel member 24 and shaft 28 as described below and a snap cap 36.

In the illustrated embodiment, shaft 28 is integrally formed with a vent housing 40 but as will be apparent to those of skill in the art, shaft 28 can be a separate component which is attached to a suitable point on, or adjacent to, vent housing 40 or any other control surface or device to be controlled.

Wheel member 24 includes a grip surface 44 about at least a portion of its periphery. Grip surface 44 is fabricated from a material which provides an aesthetically pleasing feeling and a suitable frictional surface to the passenger operating control wheel 20. A variety of suitable materials will occur to those of skill in the art and include silicone or latex rubbers, etc. and grip surface 44 is not required for control wheel 20, but is instead merely a preferred feature.

Figure 2:
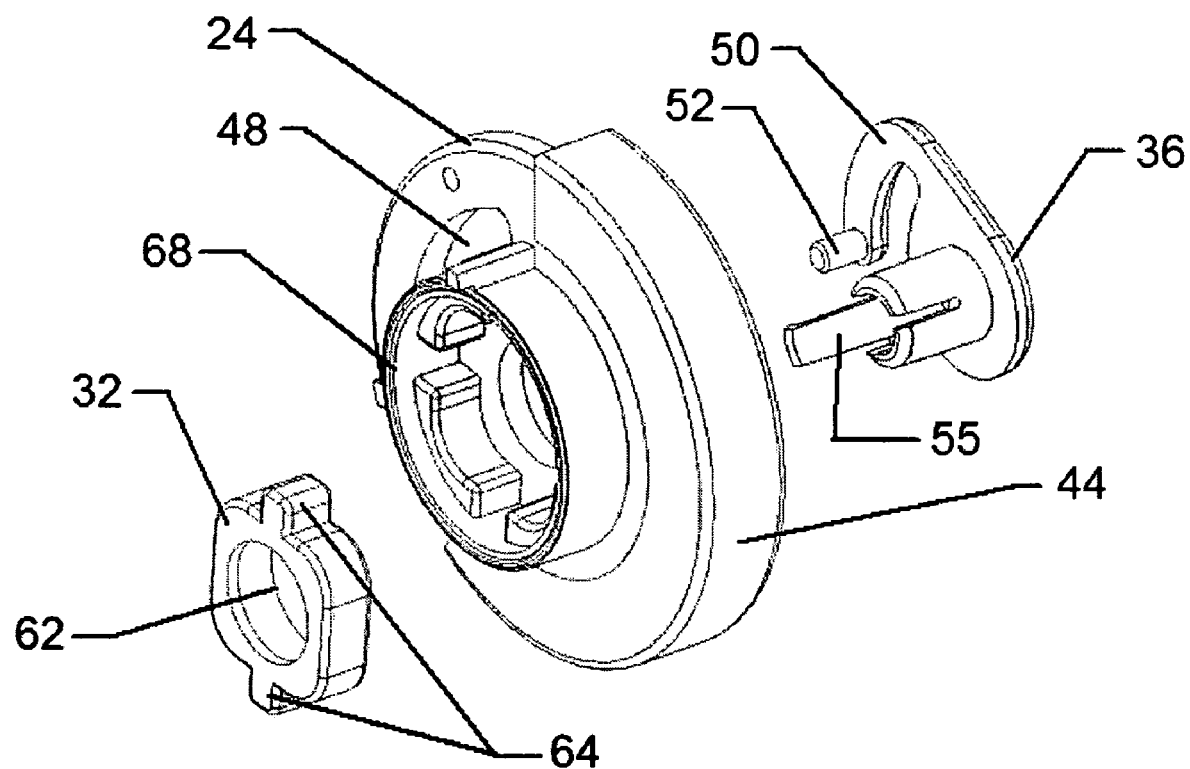
FIG. 2 shows an exploded view of the inner side of a portion of the control wheel of FIG. 1.
Figure 3:
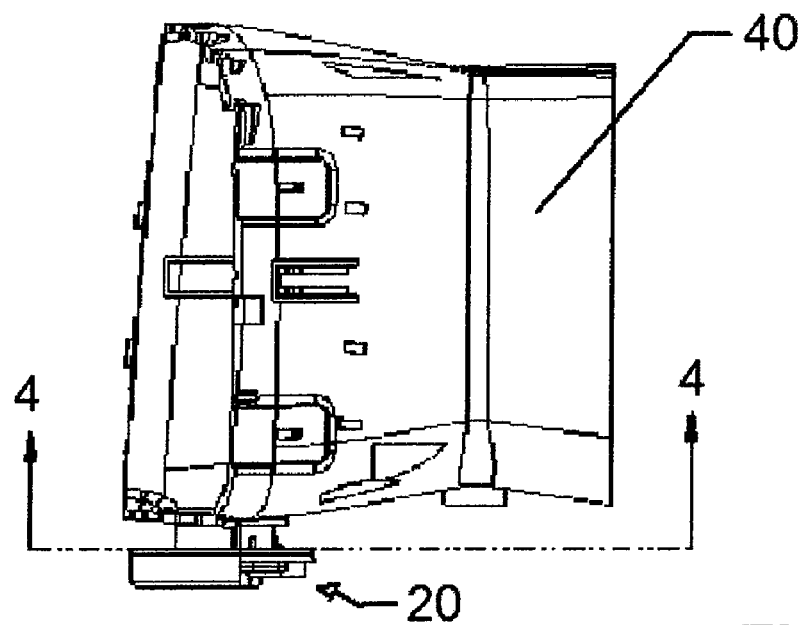
FIG. 3 shows a top view of an assembled vent with the control wheel of FIG. 1.

As best seen in FIG. 2, snap cap 36 includes a detent arm 50 with an end 52 which engages a limit track 48 in wheel member 24. Snap cap 36 further includes a snap arm 55, best seen in FIG. 2 and a keyway slot 57, best seen in FIG. 1. When control wheel 20 is assembled, snap arm 55 extends into shaft 28 and the inner peripheral edge of shaft 28 to maintain wheel 20 in its assembled state. While in the embodiment illustrated in FIG. 2 snap cap 36 includes a single snap arm 55, as will be apparent to those of skill in the art that two or more such snap arms can be provided to enhance retention of snap cap 36 to shaft 28 if desired.

Shaft 28 also includes a key 59 which engages keyway slot 57 when control wheel 20 is assembled to prevent rotation of snap cap 36 when wheel member 24 is rotated. Thus, limit track 48 serves to limit the range of movement of wheel member 24 about shaft 28 to that desired by the designer of control wheel 20 by having the end 52 of detent arm 50 abut the respective ends of limit track 48. Preferably, each end of limit track 48 includes a detent which end 52 enters at the respective limit of movement of wheel member 24 to provide a positive indication to the operator of control wheel 20 that a movement limit has been reached. Also preferably, detent arm 50 is shaped and dimensioned to provide an appropriate feedback to a passenger operating control wheel 20 when an end of the operating range is reached. In the present embodiment, detent arm 50 has an arc-shape which has been found to provide an appropriate feedback.

As will be apparent to those of skill in the art, control wheel 20 need not include a limit track 48, or detents at the ends of limit track 48 or detent arm 50 and these are merely preferred aspects of control wheel 20.

Wheel member 24 includes a receptacle 60 to receive a control, such as one end of a control rod or other suitable mechanism, which transfers the rotational movement of wheel member 24 to the control surface or device being controlled by control wheel 20.

Resilient bushing 32 includes an interior bore 62 which is sized to frictionally engage the outer surface of shaft 28. Resilient bushing 32 further includes at least one boss 64, and in the illustrated embodiment two bosses 64, which engage complementary slots 70 in the hub 68 of wheel member 24 when resilient bushing 32 is inserted therein during assembly of control wheel 20.

Figure 4:
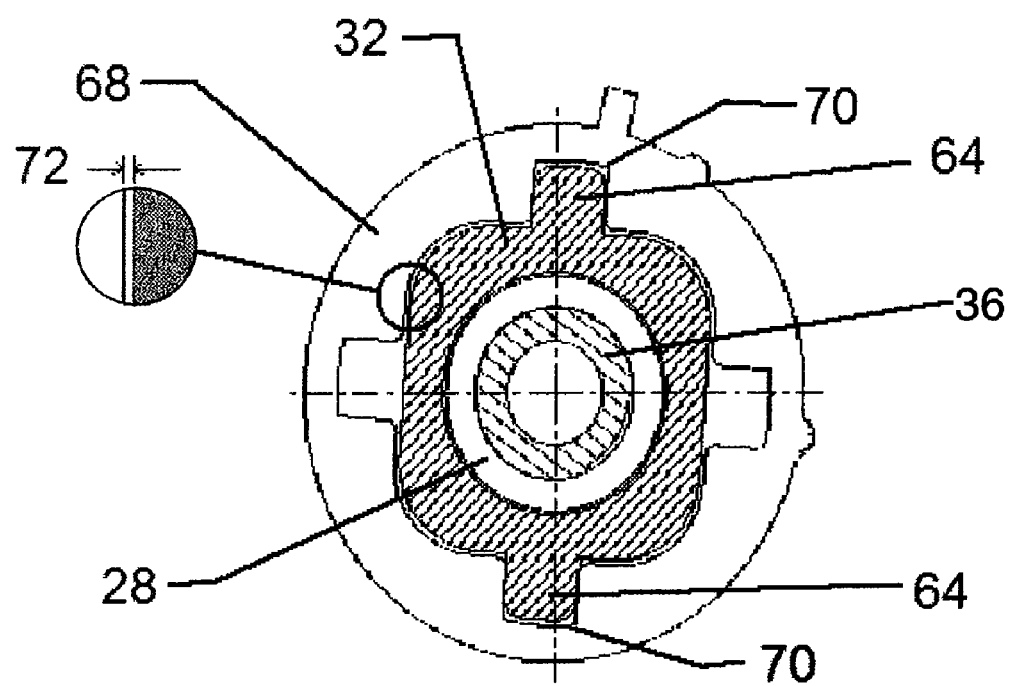
FIG. 4 shows a section taken through line 4-4 of FIG. 3.
Figure 5:
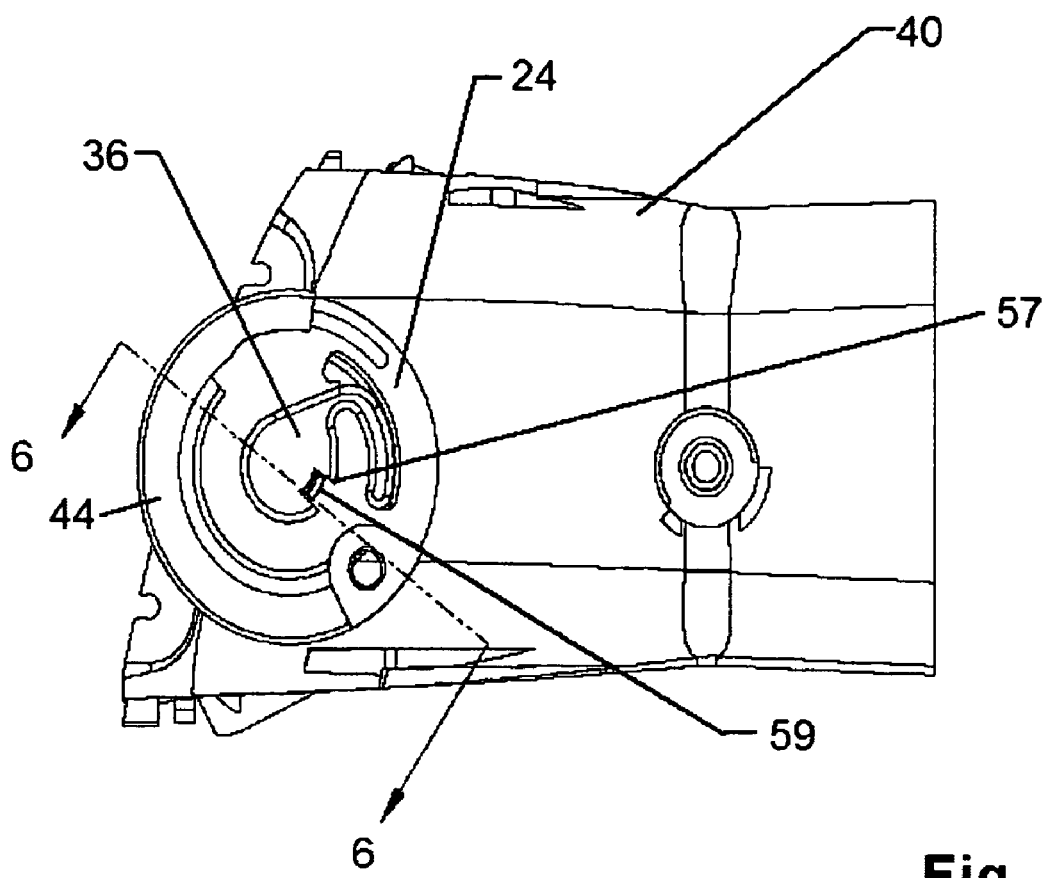
FIG. 5 shows a side view of the assembled control wheel of FIG. 1.

FIG. 4 shows resilient bushing 32 in place in hub 68 in more detail. As shown, bosses 64 are captured in complementary slots 70 with the sides of bosses 64 abutting the walls of slots 70. However, as is also illustrated, the rest of resilient bushing 32 is received in hub 68 with a clearance 72.

In a present embodiment of the invention, resilient bushing is fabricated from soft Hytrel™ material, although it is contemplated that many other materials, such as soft silicone, can also be employed provided that the selected materials substantially maintain their dimensional properties at higher temperatures. In the present embodiment, with resilient bushing 32 fabricated from Hytrel™, clearance 72 is on the order of about 0.1 mm. While shown as being substantially square in the illustrated embodiment, resilient bushing 32 can be other shapes provided only that at least one boss 64 be provided to engage a complementary slot 70 and that a clearance 72 be provided between resilient bushing 32 and receptacle 60.

Clearance 72 is provided to accommodate minor tolerance variations in resilient bushing 32, receptacle 60 and shaft 28. These tolerance variations can be due to manufacturing variances or thermal expansion or contraction of these components in use. By avoiding the necessity of manufacturing these components to very precise tolerances, the cost of manufacturing a control wheel in accordance with the present invention can be reduced.

In prior art control wheels, no clearance was provided and thus expected tolerances could result in the bore more tightly engaging the shaft due to compression of the bushing within the receptacle, due to the bushing, receptacle and/or shaft being sized incorrectly. Further, such variations in component sizing could occur subsequent to manufacture due to thermal expansion or contraction of the components due to changes in the temperature of the passenger compartment.

Figure 6:
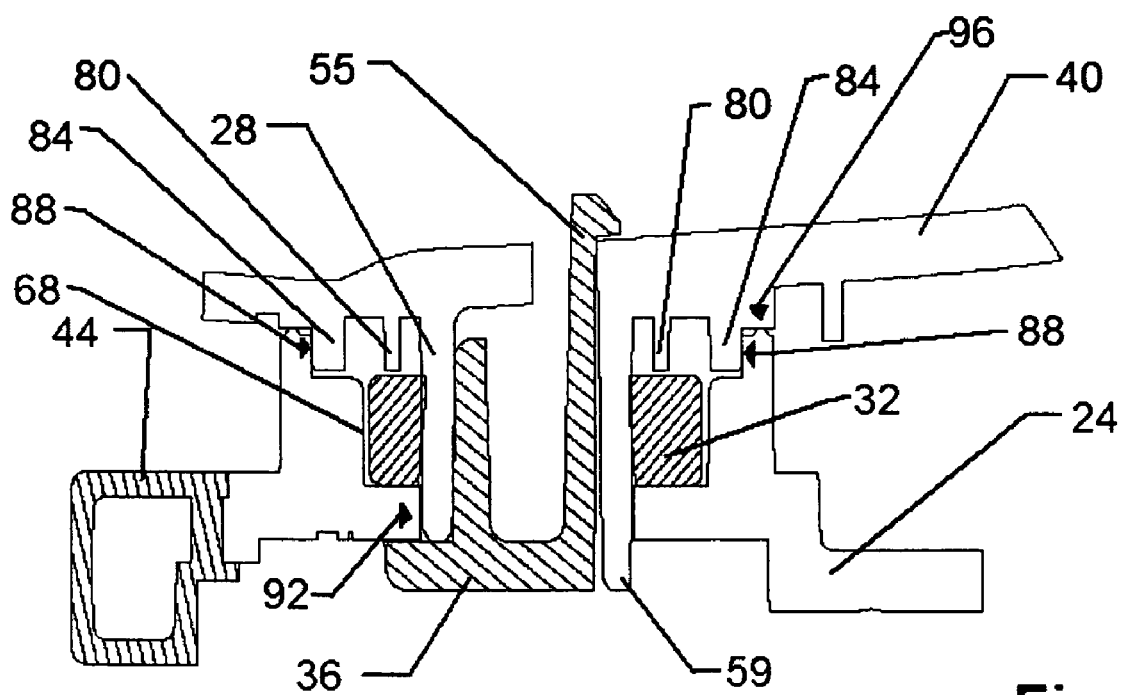
FIG. 6 shows a section of the control wheel taken through line 6-6 of FIG. 5.

Another feature of control wheel 20 which is believed to provide advantages is the method by which wheel member 24 is mounted to vent housing 40. Specifically, it is expected that wheel member 24 can be subjected to lateral forces during operation and it is desired that wheel member 24 still rotate about shaft 28 without requiring any significant increase in operating force, even when wheel member 24 is subjected to such lateral forces. As best seen in FIGS. 1 and 6, housing 40 includes a first ring 80 and a second ring 84, each of which extend outwardly from housing 40 and encircle shaft 28 at different radii. When control wheel 20 is assembled, first ring 80 abuts resilient bushing 32 to prevent resilient bushing 32 from sliding down shaft 28 out of hub 68. Second ring 84 abuts the inner surface of hub 68, as indicated at 88 and provides a reaction surface against which hub 68 will ride to counter lateral forces applied to wheel member 24 during operation. Thus, wheel member 24 rides on shaft 28, as indicated at 92, and on housing 40, as indicated at 96, and on the outer surface of second ring 84, as indicated at 88. By employing these three contact surfaces 88, 92 and 96, wheel member 24 can be operated with a force that is largely independent of any lateral or off-axis forces applied to wheel member 24.

As will now be apparent, control wheel 20 is relatively simple to manufacture and is easily and efficiently assembled. Resilient bushing 32 provides the necessary frictional force over its expected operating temperature range to retain wheel member 24 in a desired position and is resilient enough to dampen vibration from the automobile such that wheel member 24 will not vibrate or move. Detent arm 50 and limit track 48 cooperate to both limit the range through which wheel member 24 can be moved and to provide a positive indication to a passenger operating control wheel 20 that an end of the operating range has been reached.

The present invention provides a control wheel that is relatively easy to assemble and which provides a frictional force provided by a resilient bushing to retain the wheel member in a desired position, which frictional force is substantially independent of operating temperatures and manufacturing tolerances of the components of the control wheel.

The above-described embodiments of the invention are intended to be examples of the present invention and alterations and modifications may be effected thereto, by those of skill in the art, without departing from the scope of the invention which is defined solely by the claims appended hereto.

We claim:

1. A control wheel for operating a control surface in an automotive vent, comprising:
    a wheel member having an attachment point to which the control can be connected;
    a shaft about which the wheel member can rotate to move the control;
    a resilient bushing mounted in a receptacle in the wheel member, the bushing having a bore engaging the shaft which passes through it and the bushing acting between the wheel member and the shaft to create a frictional force to inhibit free rotation of the wheel member about the shaft, the resilient bushing including at least one boss on its outer periphery such that when the bushing is mounted in the receptacle there is a clearance between the bushing and the receptacle except where the at least one boss engages a complementary slot in the receptacle to provide a connection between the bushing and the wheel member, the clearance being sized to accommodate expected tolerances;

a snap cap to maintain the wheel member on the shaft; and a limit track on the wheel member and an arm on the snap cap, the arm having a portion engaging the limit track to limit the range through which the wheel member can be rotated on the shaft to a permitted range.

2. A control wheel according to claim 1 wherein the limit track includes a detent at each end of the limit track to provide a positive indication to a user that the end of the permitted range has been reached.

3. A control wheel according to claim 2 wherein the arm is arc-shaped.

4. A control wheel according to claim 1 wherein the wheel member further includes a grip surface over a portion of its outer periphery to be engaged by a finger of a user.

5. A control wheel according to claim 1 wherein the shaft is integrally formed with the vent to be controlled by the control wheel.

6. A control wheel according to claim 1 wherein the snap cap includes at least one snap arm to engage the inner surface of the shaft to maintain the snap cap in place.

7. A control wheel according to claim 6 wherein the snap cap further includes a keyway and the shaft includes a key to engage the keyway when the snap cap is in place to prevent rotation of the snap cap with respect to the shaft.

8. A control wheel according to claim 1 wherein the expected tolerances include both the expected manufacturing variation in the size of components of the control wheel and the variation in the size of the components due to thermal expansion and/or contraction of the components.

9. A control wheel according to claim 1 wherein the wheel member and the shaft share three contact surfaces, the three contact surfaces providing a resistance to lateral forces on the wheel member during operation of the control wheel.

\* \* \* \* \*